United States Patent
Horna et al.

(10) Patent No.: US 6,896,504 B2
(45) Date of Patent: May 24, 2005

(54) NOZZLE ARRANGEMENT, NOZZLE CARRIER AND DEVICE FOR EXTRUDING DOUGHY SUBSTANCES

(75) Inventors: Marc Horna, Ilsfeld (DE); Frank Altvater, Heilbronn (DE)

(73) Assignee: Hosokawa Bepex GmbH, Leingarten (DE)

( * ) Notice: Subject to any disclaimer, the term of this patent is extended or adjusted under 35 U.S.C. 154(b) by 287 days.

(21) Appl. No.: 10/068,246

(22) Filed: Feb. 5, 2002

(65) Prior Publication Data

US 2002/0084281 A1 Jul. 4, 2002

Related U.S. Application Data

(63) Continuation of application No. PCT/EP00/07552, filed on Aug. 3, 2000.

(30) Foreign Application Priority Data

Aug. 5, 1999 (DE) .......................... 199 36 815

(51) Int. Cl.[7] .................. B29C 47/24; B29C 47/30
(52) U.S. Cl. ........................ 425/133.1; 425/192 R; 425/381; 425/382 R; 425/382.3; 425/466; 425/319
(58) Field of Search ............. 425/133.1, 131.1, 425/192 R, 381, 381.2, 382 R, 463, 382.3, 382.4, 466, 467, 468, 319, 462, 190; 426/516, 517

(56) References Cited

U.S. PATENT DOCUMENTS

| | | | |
|---|---|---|---|
| 1,759,928 A | * 5/1930 | Allen | 425/133.1 |
| 2,532,131 A | 11/1950 | Voorst | 425/463 |
| 4,288,463 A | 9/1981 | Groff et al. | 426/500 |
| 4,715,803 A | * 12/1987 | Koppa | 425/133.1 |
| 4,900,572 A | 2/1990 | Repholz et al. | 426/282 |
| 5,120,554 A | 6/1992 | Farnsworth et al. | 426/282 |
| 5,492,706 A | * 2/1996 | Cockings et al. | 426/282 |
| 5,518,749 A | 5/1996 | Weinstein | 426/500 |
| 5,620,713 A | 4/1997 | Rasmussen | 425/131.1 |
| 5,637,341 A | 6/1997 | Rivlin | 426/496 |
| 5,834,040 A | 11/1998 | Israel et al. | 425/381 |

FOREIGN PATENT DOCUMENTS

| | | |
|---|---|---|
| EP | 0168255 A2 | 1/1986 |
| EP | 0177175 A2 | 4/1986 |
| EP | 0287209 A2 | 10/1986 |
| EP | 0202143 A2 | 11/1986 |
| EP | 0434983 A1 | 8/1991 |
| EP | 0704158 A1 | 4/1996 |
| WO | WO 9303909 | 3/1993 |
| WO | WO 9725881 | 7/1997 |

* cited by examiner

Primary Examiner—Joseph S. Del Sole
(74) Attorney, Agent, or Firm—Clifford N. Browning; Woodard, Emhardt, Moriarty, McNett & Henry LLP (57) ABSTRACT

For producing coiled bakery products comprising two strands each made of an outer and an inner doughy substance, a nozzle arrangement (12) comprises two inner nozzles (14, 16), which are each surrounded by an outer nozzle (18, 20), wherein all of the nozzles (14, 16, 18, 20) are rotatable about a common axis of rotation (148).

9 Claims, 10 Drawing Sheets

NOZZLE ARRANGEMENT, NOZZLE CARRIER AND DEVICE FOR EXTRUDING DOUGHY SUBSTANCES

This application is a continuation of international application number PCT EP00/07552, filed Aug. 3, 2000.

The invention relates to a nozzle arrangement and to a nozzle carrier as well as a device for extruding doughy substances having such a nozzle arrangement.

BACKGROUND OF THE INVENTION

Bakery products, pastries and confectionery are often extruded by forcing a substance placed under pressure through a nozzle arrangement to form a strand. The strand may as such be carried away by a conveyor belt or it may be divided into short portions. The external shape, in particular the peripheral shape of the strand is dependent upon the nozzle arrangement.

From the document U.S. Pat. No. 5,637,341, which forms the basis for the preamble of claim 1, a device for manufacturing plaited dough products is known, which comprises three driving wheels, which are arranged in a row and with which four nozzle plates are associated. The nozzle plates are alternately turned over between the driving wheels and, in the process, plait the emerging dough strands. A nozzle plate, while it is moved by a driving wheel, is rotated about its axis. With such a device it is not possible to produce filled dough products.

From EP-A-0 704 158 a nozzle arrangement is known, in which a stationary inner nozzle is surrounded by a middle and an outer nozzle, which are formed in a rotor. All of the nozzles are disposed coaxially. With such a nozzle arrangement it is possible to manufacture dough products having one strand, which comprises a filling and two enveloping doughy substances.

From EP-A-0 168 255 and EP-A-0 177 175 devices for co-extruding two substances are known, which extrude an inner substance through a nozzle and an outer substance containing granular particles through a hopper surrounding the nozzle, wherein the substances are combined to form a strand. The hopper at its mouth has sharp edges so that the granular particles in the outer substance may pass onto the surface. The mouth of the hopper may be of a toothed design so that the particles also project from the surface. The composite strand is carried away by a conveyor belt. By said means it is possible to produce from two substances a bakery product, which has a rectilinear elongate shape and has granular particles at the surface.

From EP-A-0 202 143 A2 a triple extruder is known, by means of which an inner substance may be coated with a first outer substance, and the latter may be coated with a second outer substance. The inner substance is fed through a middle feed channel to an inner nozzle. An outer nozzle surrounds the inner nozzle and is supplied with the outer substance through a lateral feed channel. A hopper surrounds the outer nozzle. The second outer substance is supplied through the hopper. The outer nozzle and the hopper each form an annular space around the inner nozzle. In longitudinal section, said annular spaces have an angular shape. With such a triple extruder it is possible to produce a likewise elongate, externally rectilinear bakery product.

U.S. Pat. No. 5,120,554 describes a stand-alone nozzle head for extruding a doughy substance. The nozzle head at its periphery has a plurality of nozzle arrangements. The nozzle arrangements are formed in each case by a double nozzle for manufacturing filled bakery products. Said double nozzles each have an inner nozzle, which is supplied through an individual feed channel, and an outer nozzle. The outer nozzles are supplied via a common cylindrical feed chamber through lateral channels. The nozzle head enables simultaneous extrusion of a plurality of filled, straight strands.

From U.S. Pat. No. 5,518,749 and WO 97/25881 a method and a device for manufacturing twisted cereal products are known. A rotor, which extends through a chamber and runs into an opening of the chamber, forms an inner nozzle, through which ah inner substance is feedable. A second substance is feedable through a lateral channel into the chamber. Between the opening of the chamber and the rotor there is an annular gap, through which the second substance may exit. The annular gap corresponds to an outer nozzle. When the rotor, and/or the inner nozzle, rotates, a product having a twisted outer substance layer and a filling is produced. In said case, however, the twisting of the outer substance layer is highly dependent upon the properties of the outer substance, such as e.g. its flow behaviour and viscosity. The extruded cereal products therefore do not always have a sufficiently uniform shape.

SUMMARY OF THE INVENTION

The object of the invention is to provide a nozzle arrangement, a nozzle carrier and a device for extruding doughy substances, with which it is possible with a very high degree of accuracy as regards shape and weight to manufacture coiled dough products, in which a plurality of coiled strands are individually filled.

The object is achieved according to the invention by a nozzle arrangement in which the twisting of the individual strands is precisely adjustable by varying the speed of rotation.

By virtue of the advantageous development according to the invention the coupling of the outer substance to the inner substance is improved.

According to the invention the nozzle arrangement is accommodated in a compact manner in a nozzle carrier. The latter may be developed by the design features by which it is possible to manufacture coiled bakery products, the individual strands of which each have identical fillings and identical coatings.

According to the invention the nozzle arrangement is accommodated in a nozzle carrier in such a way that the bakery products manufactured with such a nozzle carrier comprise two different types of coating and one filling or one coating and two different types of filling. Such a nozzle carrier may advantageously be developed according to the present invention.

According to the invention the nozzle arrangement is accommodated in a nozzle carrier in such a way that the bakery products manufactured with such a nozzle carrier comprise two different types of coating and two different types of filling. Such a nozzle carrier may advantageously be developed according to the present invention.

An advantageous development of the nozzle carriers according to the invention provides that the nozzle carrier rotates about the centre line of the axes of the nozzles, thereby producing a bakery product which is coiled about its centre line.

The annular spaces, which are formed in the nozzle carriers, are according to the invention in longitudinal section in sections circular or elliptical in shape. The substance flowing into or out of the annular space or inside the annular space is therefore prevented from flowing over sharp edges, which would generate turbulence in the substance. The annular spaces moreover serve as pressure compensation spaces, so that it is possible to generate a uniform output rate from the mouths of the outer nozzles and hence form bakery products of precisely is identical outer shape and of identical weight.

By virtue of the developments according to the invention, conveying and distributing of the doughy substance in the annular channels is improved.

For driving the said nozzle carrier in a device, according to the invention a traction mechanism gearing is particularly suitable, in particular a toothed belt drive, or a toothed gearing with intersecting axes, wherein in a particularly preferred configuration a plurality of nozzle carriers are drivable simultaneously.

A preferred embodiment of the invention according to the invention provides that the nozzle carrier(s) is (are) disposed so as to be inclined at an angle α of around 25° to the vertical. By virtue of the inclined nozzle carrier the emerging substances encounter a support, e.g. a conveyor belt, obliquely and are therefore, as they are moved away, deformed less than would be the case if the substances emerged vertically.

BRIEF DESCRIPTION OF THE DRAWINGS

There now follows a detailed description of embodiments of nozzles according to the invention, nozzle carriers according to the invention and devices according to the invention for extruding doughy substances with reference to diagrammatic drawings. The drawings show.

DETAILED DESCRIPTION OF THE PREFERRED EMBODIMENTS

FIGS. 1, 4, 7, 17 and 20 each show a nozzle carrier 10 having a nozzle arrangement 12. Each nozzle arrangement 12 comprises two inner nozzles 14 and 16 as well as two outer nozzles 18 and 20. The nozzles 14 to 20 are disposed in a rotor 22, which is rotatably supported. For manufacture of the bakery products, substances are extruded from each of the nozzles 14 to 20. At the same time the rotor 22 rotates and the resulting bakery product has two coiled strands, each of which comprises a filling and a coating. The embodiments of the nozzle carrier 10, which are illustrated in FIGS. 1, 4, 7 and 20, each enable a different configuration of the bakery product in that, for the filling and the coating of the individual strands of the bakery product, in each case different substances are extrudable.

Figure 1:
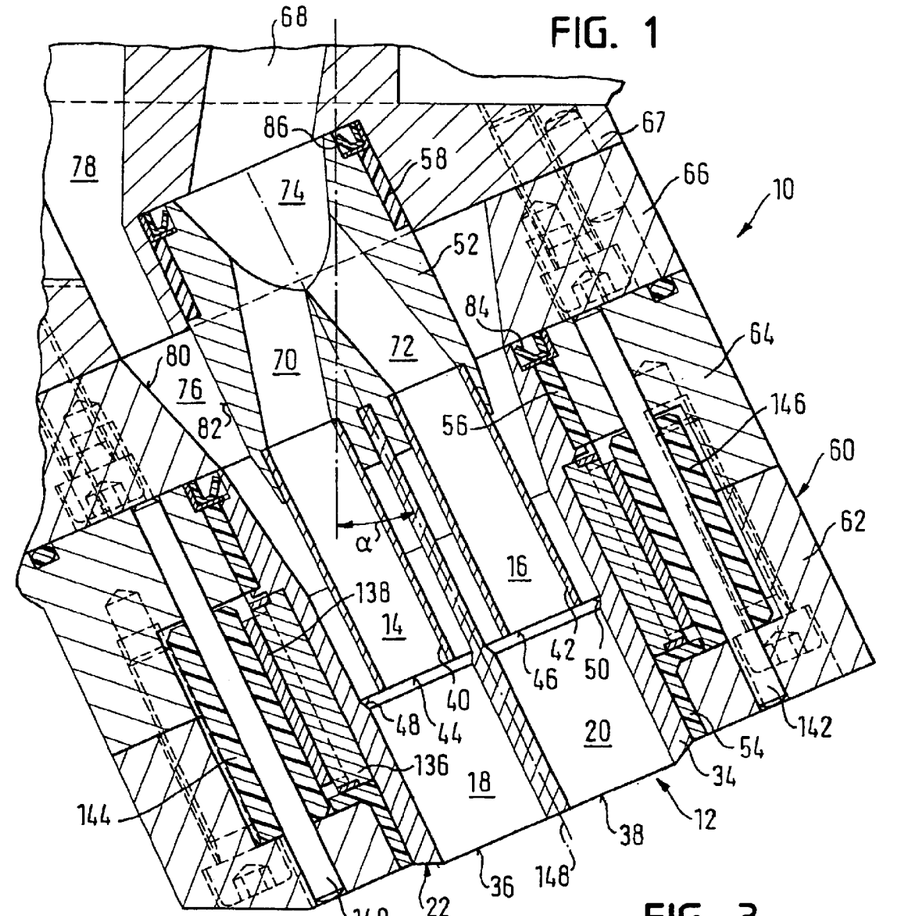
FIG. 1 a first embodiment of a nozzle carrier according to the invention in longitudinal section, FIG. 2 a side view of an example of a bakery product produced using the nozzle carrier illustrated in FIG. 1, FIG. 3 the cross section III—III in FIG. 2, FIG. 4 a second embodiment of a nozzle carrier according to the invention and parts of the device surrounding it in longitudinal section, FIG. 5 a side view of an example of a bakery product produced using the nozzle carrier illustrated in FIG. 4, FIG. 6 the cross section VI—VI in FIG. 5, FIG. 7 a third embodiment of a nozzle carrier according to the invention in longitudinal section, FIG. 8 a side view of an example of a bakery product produced using the nozzle carrier illustrated in FIG. 7, FIG. 9 the cross section denoted by IX—IX in FIG. 8, FIG. 10 a sectional front view of an annular insert according to the invention of a nozzle carrier illustrated in FIGS. 1, 4 and 7, FIG. 11 the section XI—XI in FIG. 10, FIG. 12 the view XII—XII in FIG. 10, FIG. 13 a side view of a rotor according to the invention of the nozzle carrier illustrated in FIG. 4, FIG. 14 the view XIV—XIV in FIG. 13, FIG. 15 a side view of a rotor according to the invention of the nozzle carrier illustrated in FIG. 7, FIG. 16 the view denoted by XVI—XVI in FIG. 15.
Figure 2:
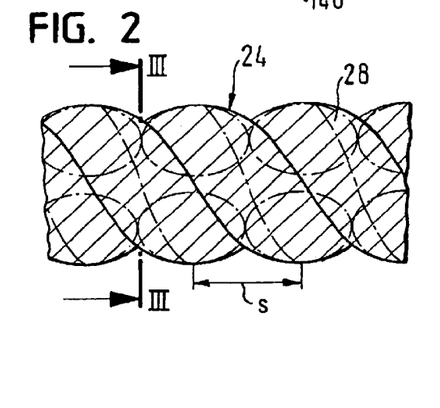
Figure 3:
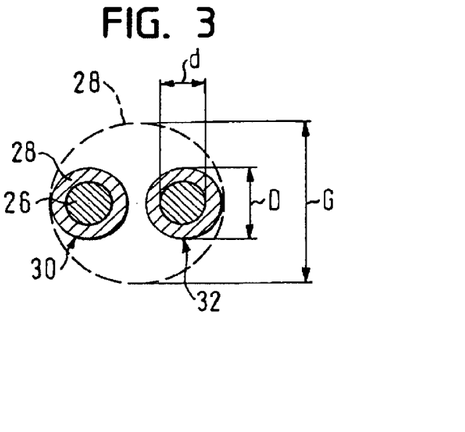

FIG. 1 shows an embodiment of the nozzle arrangement 10, which enables a bakery product 24 (FIGS. 2 and 3), in which the two strands 30 and 32 of the bakery product 24 each comprise an identical filling 26 and an identical coating 28.

For said purpose, the nozzles 18 and 20 take the form of juxtaposed circular-cylindrical openings in a cylinder 34. The nozzles 18 and 20 each have a mouth 36 and 38 respectively and their axes run parallel.

Disposed concentrically in the nozzles 18 and 20 are the nozzles 14 and 16 respectively, which are radially delimited by a pipe piece 40 and 42 respectively. The pipe pieces 40 and 42 each terminate at a mouth 44 and/or 46 in the nozzles 18 and 20 in such a way that the mouths 44 and 46 are set back relative to the mouths 36 and 38 respectively.

The openings of the nozzles 18 and 20, in each case at a shoulder 48 and/or 50 disposed at the level of the mouth 44 and/or 46 and bevelled towards the axis of the nozzle 18 and/or 20, narrow in the direction of the mouths 36 and 38 respectively. During extrusion the inner substances at the mouths 44 and 46 flow together with the outer substances in the outer nozzles 18 and 20. In said case, the inner and outer substances are pressed together by the narrowed outer nozzles 18 and 20 and flow in the nozzles 18 and 20 up to the mouths 36 and 38 of the latter. Over said section the two substances combine in each case into a strand, wherein at the same time a homogeneous flow of the strand develops. The strands emerging from the mouths 36 and 38 therefore have a particularly accurate shape and there is particularly good adhesion between the substances.

The two pipe pieces 40 and 42 are held by an insert 52, which is itself fastened in the, in relation to FIG. 1, top region of the cylinder 34. The cylinder 34, the insert 52 and the pipe pieces 40 and 42 together form the rotor 22. The rotor 22 is rotatably supported in three plain bearings 54, 56 and 58. In said case, the plain bearing 54 lies in the region of the mouths 36 and 38 against the cylinder 34, while the plain bearing 56 is disposed at the opposite end region of the cylinder 34. The plain bearing 58 is disposed at the opposite end region of the insert 52 to the pipe pieces 40 and 42.

The rotor 22 is partially surrounded by a stator 60, which is formed by housing parts 62, 64, 66 and 67. The housing parts 62, 64, 66 and 67 are arranged successively and connected to one another by screws, which are illustrated by dashes. The cylinder 34 projects with the mouths 36 and 38 from the housing part 62. The plain bearing 54 is supported against the housing part 62 and at the same time axially secures the rotor 22. The plain bearing 56 cooperates with the housing part 64 and the plain bearing 58 cooperates with the housing part 67.

Formed in the insert 52 and adjoining in each case a pipe piece 40 and/or 42 are connection channels 70 and 72, which meet inside the insert 52 and terminate in a hollow 74. The hollow 74 is disposed opposite a feed channel 68, which is formed in the housing part 67. The substance of the filling 26 is feedable through the feed channel 68, flows into the hollow 74, is divided between the connection channels 70 and 72 and passes out through the pipe pieces 40 and 42 of the inner nozzles 14 and 16 respectively. In the hollow 74 the substance is in said case buffered, with the result that pressure variations in the flow of the substance are reduced and a more uniform emergence of the substance through the inner nozzles 14 and 16 is achieved.

Around the insert 52 an annular space 76, which is in communication with the two openings of the outer nozzles 18 and 20, is formed between the plain bearings 56 and 58. Leading to the annular space 76 is a feed channel 78, through which the substance of the coating 28 is feedable under pressure. The annular space 76 is delimited radially at the outside by the housing part 66. In said case, the outer wall 80 of the annular space 76 is designed in such an inclined manner that an, in relation to FIG. 1, downwardly narrowing irrotational flow into the nozzles 18 and 20 is formed. The radially inner wall 82 of the annular space 76 is in cross section (not shown) an extremely flattened oval. Extending inside said oval-shaped wall 82 of the insert 52 are the two connection channels 70 and 72, which are in each case virtually circular in cross section. The oval inner wall 82 forms a type of driver or paddle, by means of which during rotation of the rotor 22 the outer substance in the annular space 76 is simultaneously rotated so that said substance is uniformly distributed in the entire annular space 76 and so a uniform distribution of the substance in the outer nozzles 18 and 20 is produced.

The rotor 22 is sealed off relative to the stator 60 by means of two seals 84 and 86. The seal 84 is disposed, in relation to FIG. 1, above the plain bearing 56 and effects sealing between the cylinder 34 and the housing part 64. The seal 86 is disposed above the plain bearing 58 and effects sealing between the insert 52 and the housing part 67. In said case, the seal 86 is used both to seal off the inner feed channel 68 and to seal off the annular space 76.

Feeding of the substances is effected by a non-illustrated device for mixing and conveying the substance. The substances may be a mixture for bakery products, such as e.g. flour, starch, eggs and sugar, a mixture for confectionery, such as e.g. sugar, sweetener, cocoa and fats, or a fruit filling. The substances are converted by subsequent baking or cooling into foodstuffs.

The bakery product 24 (FIGS. 2 and 3) manufactured using the nozzle arrangement 10 illustrated in FIG. 1 has a helical external shape made of outer substance 28, wherein the individual strands 30 and 32 are filled with inner substance 26. The diameter d of the filling 26 of inner substance is e.g. 9 mm, while the outside diameter D of the individual coiled strand 30 or 32 is e.g. 15 mm. The result is a bakery product 24 having a total diameter G of around 33 mm and a pitch s of around 20 mm.

Figure 4:
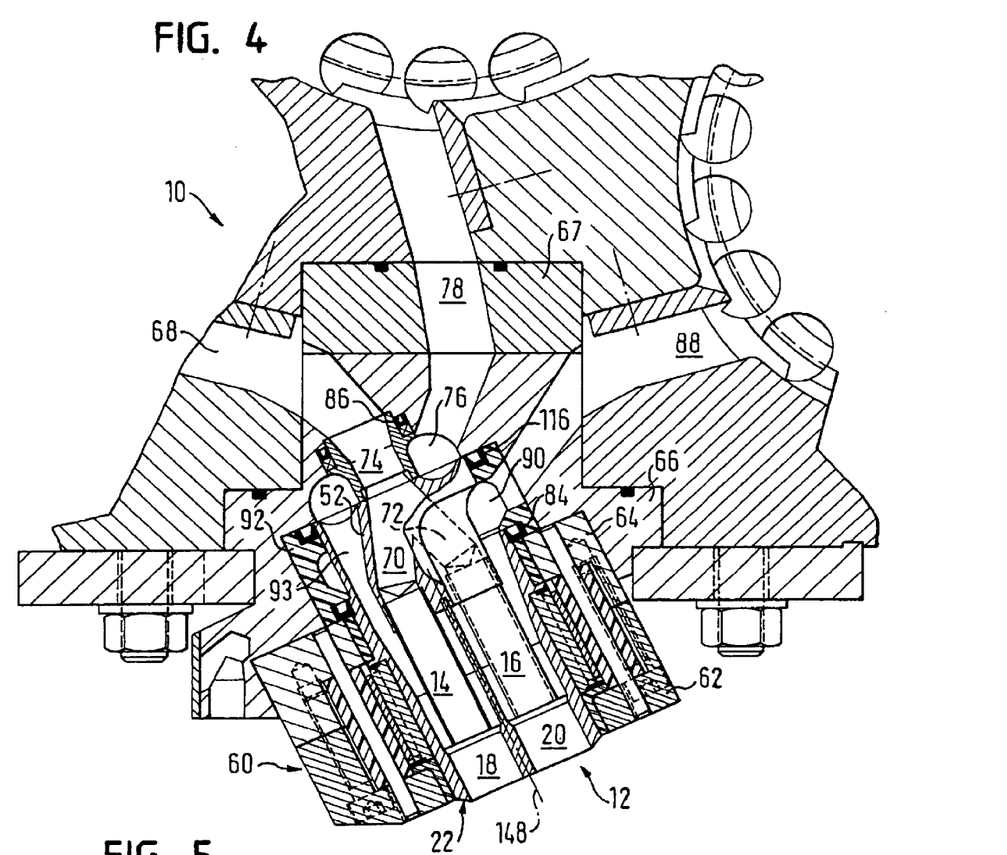
Figure 7:
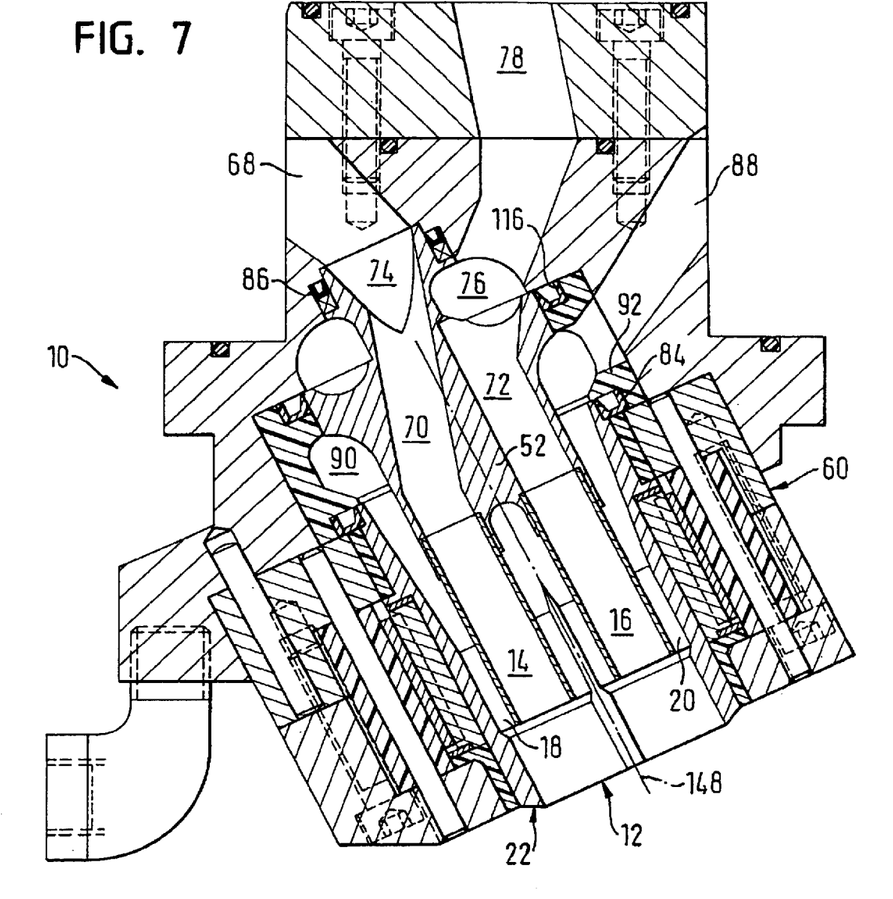
Figure 8:
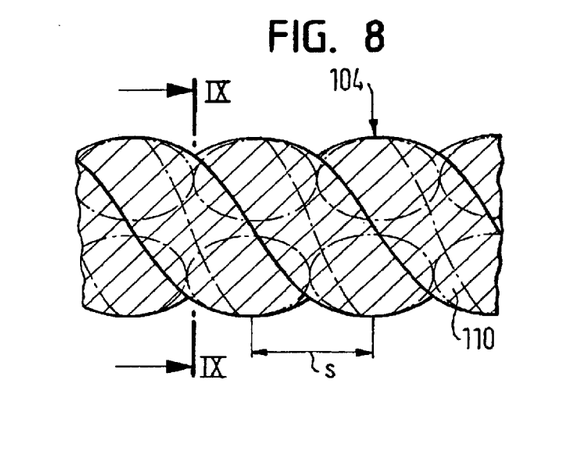
Figure 9:
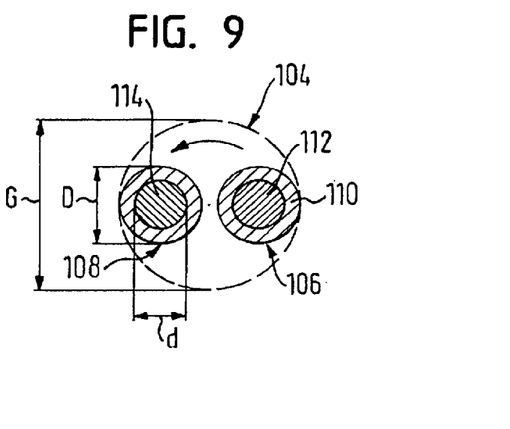
Figure 10:
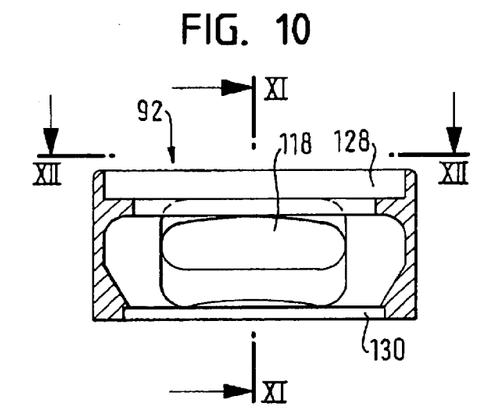
Figure 11:
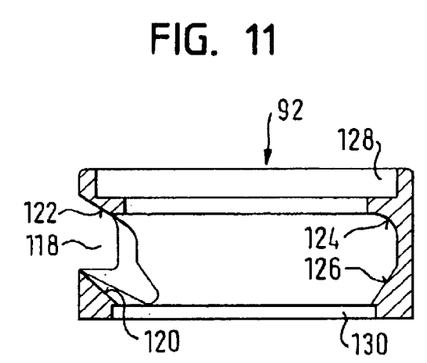
Figure 12:
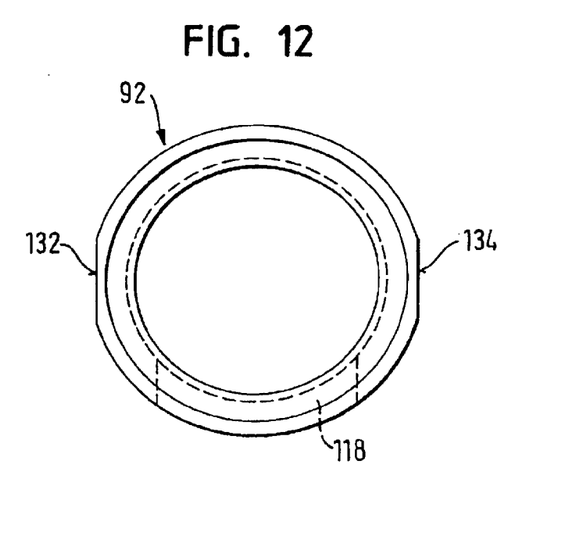

FIGS. 4 and 7 each show a nozzle arrangement 12, in which the two inner nozzles 14 and 16 with the surrounding outer nozzles 18 and 20 respectively are chargeable with three different substances. Feed channels 68, 78 and 88 are provided for feeding the substances. The feed channel 68 opens out in the insert 52 of the rotor 22. The feed channel 78 opens out into the annular space 76 and the feed channel 88 opens out into an annular space 90. The annular space 90 is formed in the outer region by an annular insert 92, which is disposed in the stator 60 and described in detail below (FIGS. 10 to 12).

Figure 5:
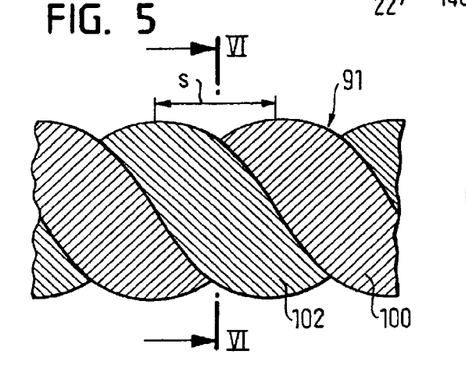
Figure 6:
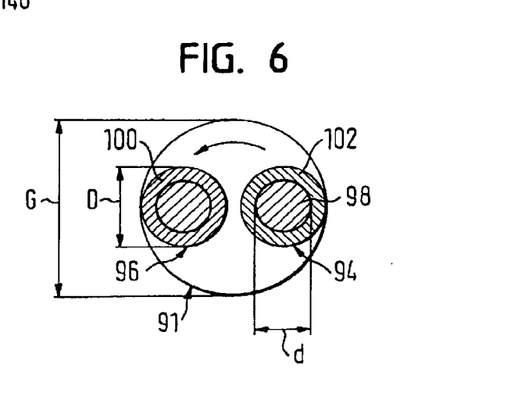

FIG. 4 shows an embodiment, in which the feed channel 68 is bifurcated in the rotor 22 by the connection channels 70 and 72 to the inner nozzles 14 and 16 respectively. The first annular space 76 is connected by a connection channel 93 to the outer nozzle 18 and the annular space 90 is connected to the outer nozzle 20. During extrusion a bakery product 91 is produced, which comprises two strands 94 and 96 coiled one around the other, each having an identical filling 98 of inner substance as well as a first outer substance 100 and/or a second outer substance 102 (FIGS. 5 and 6).

FIG. 7 shows an embodiment, in which the feed channel 68 is connected by a connection channel 70 to the inner nozzle 14 and the annular space 76 is connected by a connection channel 72 to the inner nozzle 16. The annular space 90 is connected to the outer nozzles 18 and 20.

Extrusion therefore produces a bakery product 104 comprising two coiled strands 106 and 108, which have the same coating 110 of outer substance but two different fillings 112 and 114 of inner substance. The size of the bakery products 91 and 104 illustrated in FIGS. 5, 6, 8 and 9 corresponds approximately to the size of the bakery product 24 in FIGS. 2 and 3.

The rotor 22 illustrated in FIGS. 4 and 7 is additionally sealed between the annular space 76 and the second annular space 90 by means of a seal 116. The seal 116 seals off both the annular space 76 and the annular space 90 between the insert 52 and the annular insert 92 and/or the housing parts of the stator 60.

In FIGS. 1, 4, 7, 17 and 20 it is moreover possible to see the manner of mounting the nozzle carrier 10 in an extrusion device. The nozzle carrier 10 and hence the axes of the nozzles 14, 16, 18 and 20 are disposed obliquely at an angle α of around 25° to the vertical. Because of the oblique arrangement of the nozzles the substances flowing out encounter a conveyor belt (not shown), which carries them away, obliquely and the resulting deformation of the strands is low.

In FIGS. 10 to 12 the annular insert 92 is illustrated. It has an inlet opening 118 for substance flowing in from the feed channel 88. The, in relation to FIG. 11, bottom and top side of the inlet opening 118 each take the form of an oblique inlet surface 120 and 122. The oblique inlet surfaces 120 and 122 direct the incoming substance flow in a downward direction. Thus, e.g. in the embodiment illustrated in FIG. 7, the outer substance 110 flows through the inlet opening 118 into the annular space 90, which is formed between the annular insert 92 installed in the stator 60 and the insert 52 of the rotor 22.

The top corner of the annular space 90, i.e. the, in relation to FIG. 11, axially upper, inner corner 124 of the annular insert 92, is rounded off so that the annular space 90 in longitudinal section is in sections circular or elliptical in shape. The axially opposite, bottom side 126 of the annular insert 92 is bevelled in a downward direction so that the inward flow direction of the substance initiated by the oblique inlet surfaces 120 and 122 is retained, without major turbulence arising.

The annular insert 92 at the, in relation to FIGS. 10 and 11, top and bottom end has annular shoulders 128 and 130, into which the seals 116 and 84 respectively are insertable. To prevent rotation of the annular insert 92 inserted in the stator 60, said annular insert at its periphery has two flattened portions 132 and 134.

Figure 13:
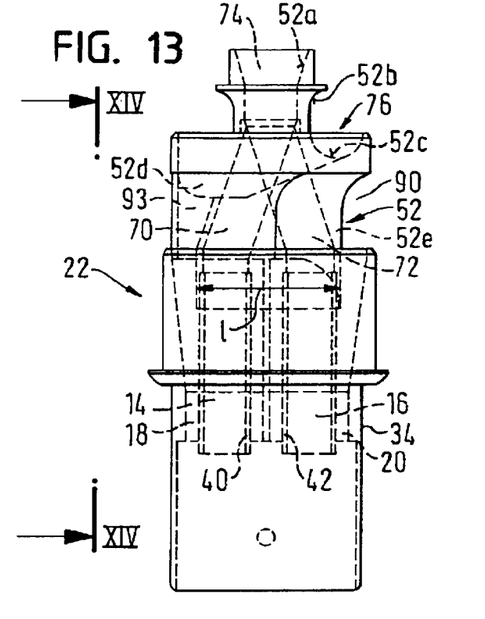
Figure 14:
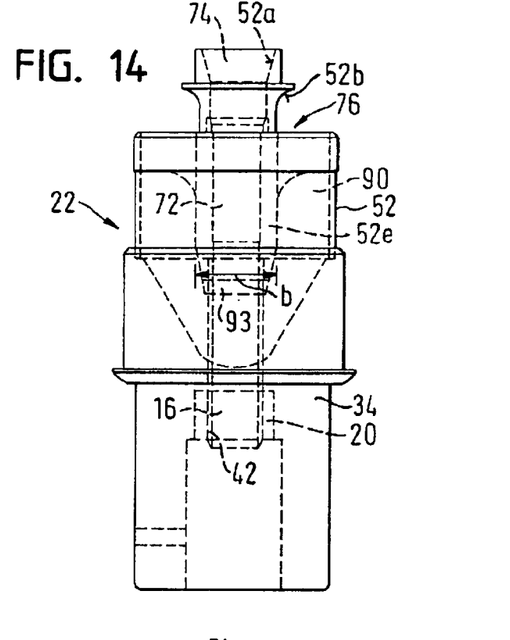

FIGS. 13 and 14 show the rotor 22 of the embodiment illustrated in FIG. 4. The rotor 22 comprises the cylinder 34 having the nozzles 18 and 20 and having the insert 52 fastened thereon. Fastened to the insert 52 are the two pipe pieces 40 and 42, which form the nozzles 18 and 20.

The hollow 74 in the insert 52 has a bevelled side wall 52a, which produces an edge-free transition to the feed channel 68. The portion of the insert 52 forming the annular space 76 has rounded corners 52b and 52c, with the result that the annular space 76 in longitudinal section is in sections circular or elliptical in shape. From the annular space 76 a funnel-shaped indentation 52d formed in the insert 52 leads to the connection channel 93 and to the opening of the nozzle 18. The connection channel 93 itself is fashioned in a funnel-shaped manner (FIG. 14). The transitions between the channels are rounded off.

The connection channels 70 and 72 branch in the drawing plane of FIG. 13 and are surrounded by a portion 52e of the insert 52 which, in cross section, has the shape of a flattened oval. The portion 52e has a width b and a length l, wherein l is greater than b, in particular is around twice as great as b. During rotation of the rotor 22 the flattened portion 52e acts as a driver or paddle for the substance situated in the annular space 90, with the result that said substance is distributed uniformly in the annular space 90.

Figure 15:
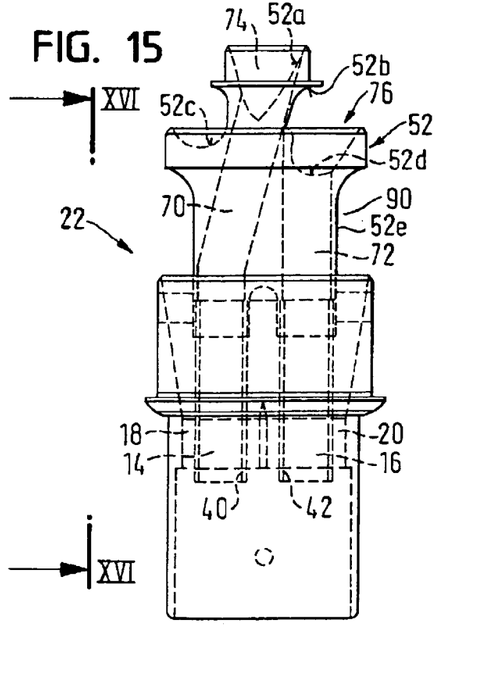
Figure 16:
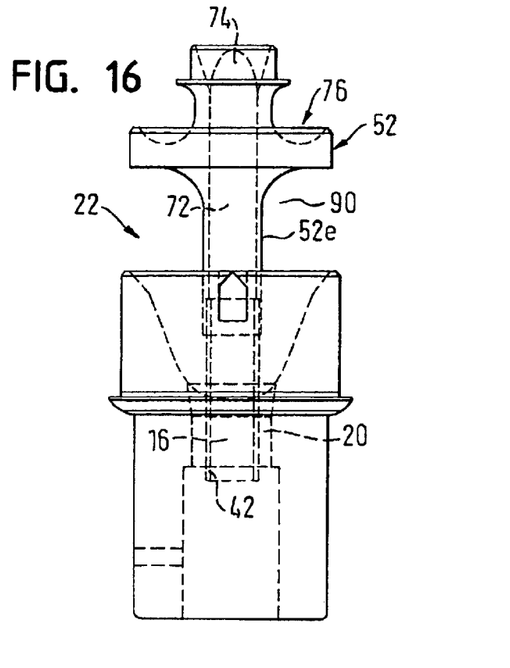

FIGS. 15 and 16 show the rotor 22 of the nozzle arrangement illustrated in FIG. 7. The connection channels 70 and 72 are formed in the flattened portion 52e of the insert 52, which portion likewise acts as a driver for the substance situated in the annular space 90.

FIGS. 1, 4, 7 show a first form of driving the nozzle arrangement 10. In said form of driving, there is formed on the cylinder 34 an external tooth system 136, with which a toothed belt 138 is in mesh. The toothed belt 138 is supported by rollers 144, 146, which are mounted in each case on a pin 140, 142. The pins 140 and 142 are fastened to the housing parts 62 and 64. Thus, the rotor 22 is rotatable relative to the stator 60 by means of the toothed belt 138.

Figure 17:
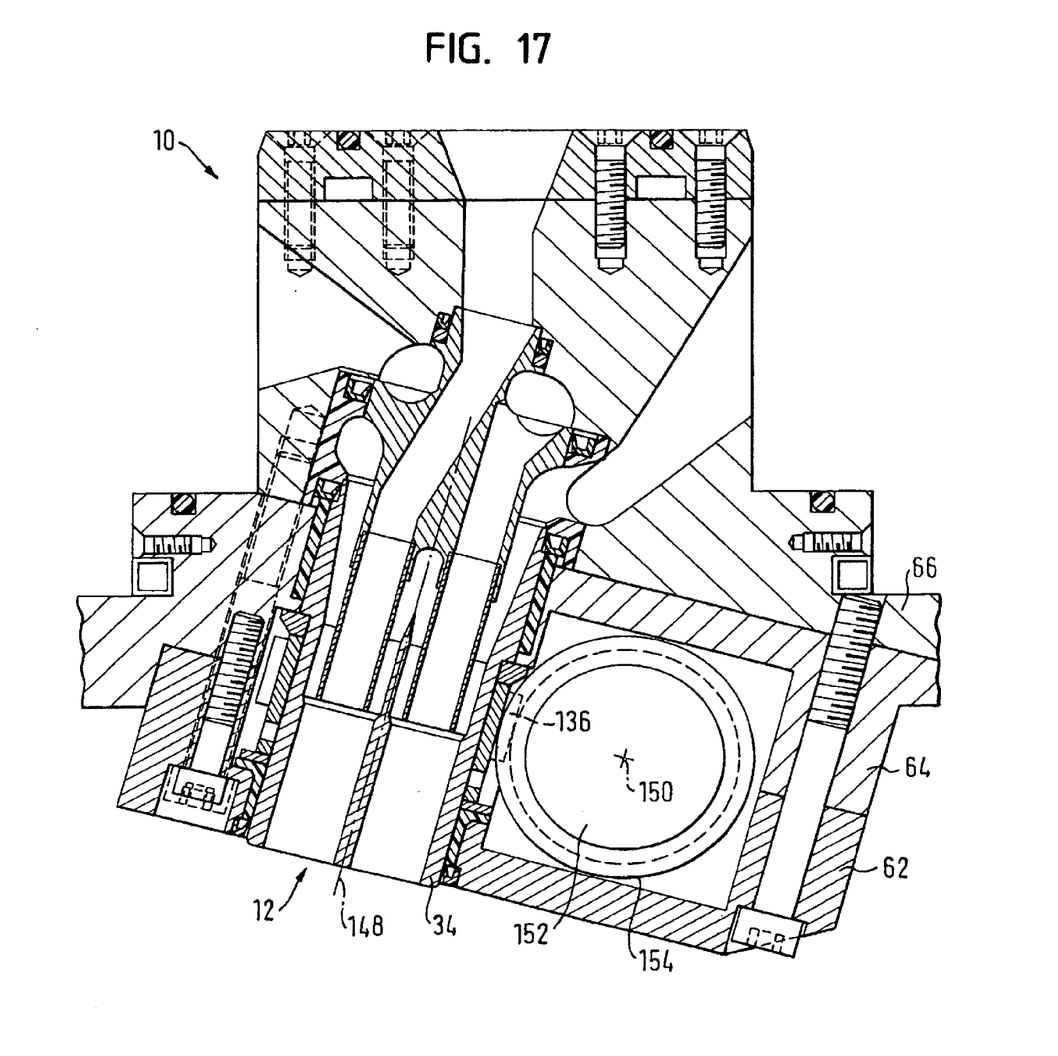
FIG. 17 a fourth embodiment of a nozzle carrier according to the invention in longitudinal section, FIG. 18 a first embodiment of a device according to the invention for extruding doughy substances having two nozzle arrangements as illustrated in FIG. 4, in longitudinal section, FIG. 19 an inverted-plan view of a second embodiment of a device according to the invention for extruding doughy substances having five nozzle arrangements, FIG. 20 a fifth embodiment of a nozzle carrier according to the invention in longitudinal section, FIG. 21 the section XXI—XXI in FIG. 20, FIG. 22 a cross section of an example of a bakery product produced using the nozzle carrier illustrated in FIG. 20, FIG. 23 the side view XXIII—XXIII in FIG. 22, FIG. 24 a side view of a rotor according to the invention of the nozzle carrier illustrated in FIG. 20, and FIG. 25 the view XXV—XXV in FIG. 24.

FIG. 17 shows a second form of driving the nozzle arrangement 10, whereby the cylinder 34 of the rotor 22 is drivable by means of a toothed gearing with intersecting axes 148 and 150. For said purpose, in the housing parts 62 and 64 a shaft 152 is rotatably supported, the axis 150 of which extends at a distance from, and at right angles to, the axis 148 of the rotor 22. The shaft 152 at its periphery lying opposite the external tooth system 136 has a tooth system 154, which meshes with the external tooth system 136. For example, both tooth systems 136 and 154 form a hypoid gear pair. The external tooth system 136 and the tooth system 154 may alternatively take the form of a bevel gear pair or worm gear pair.

Figure 18:
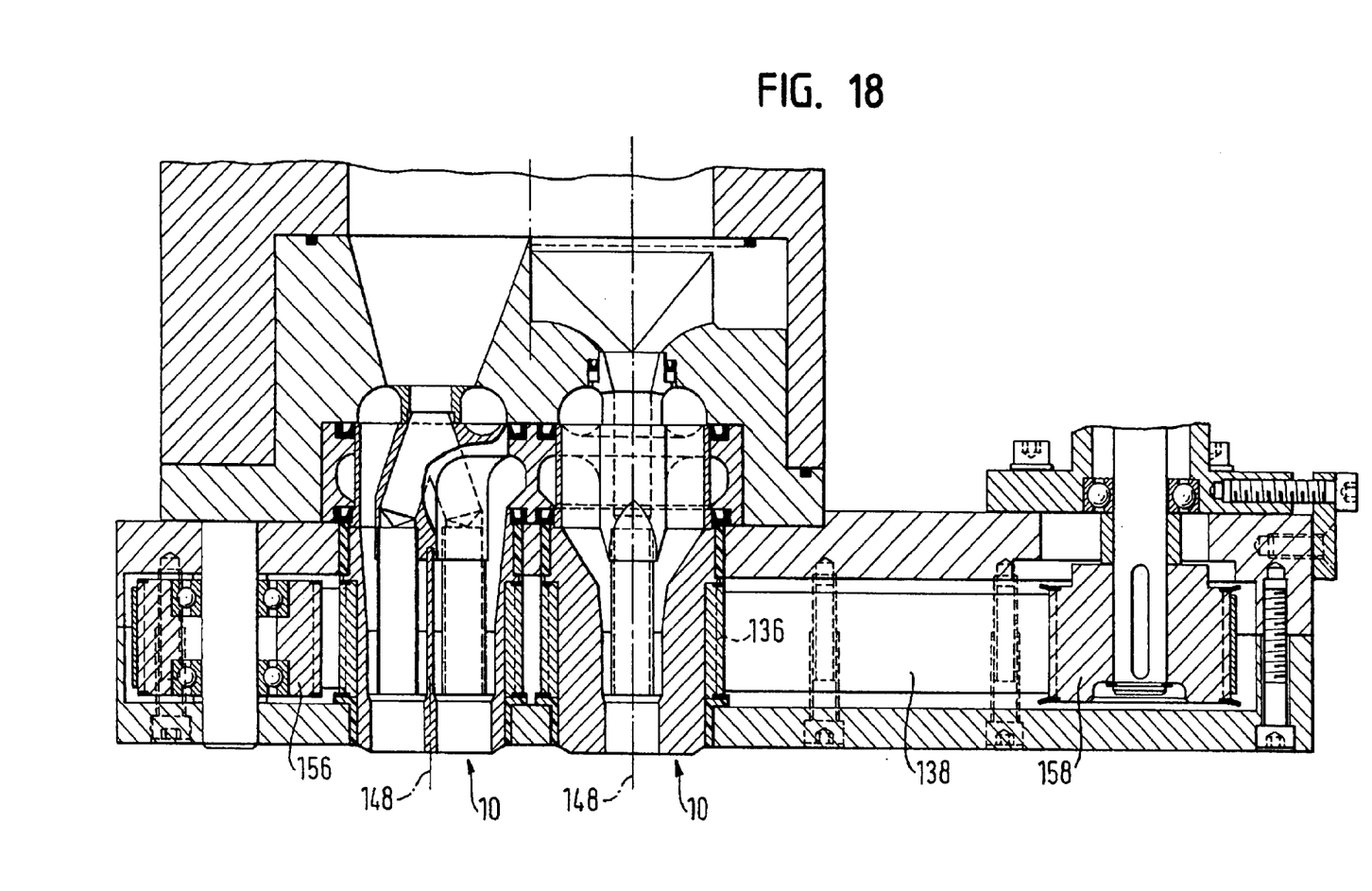
Figure 19:
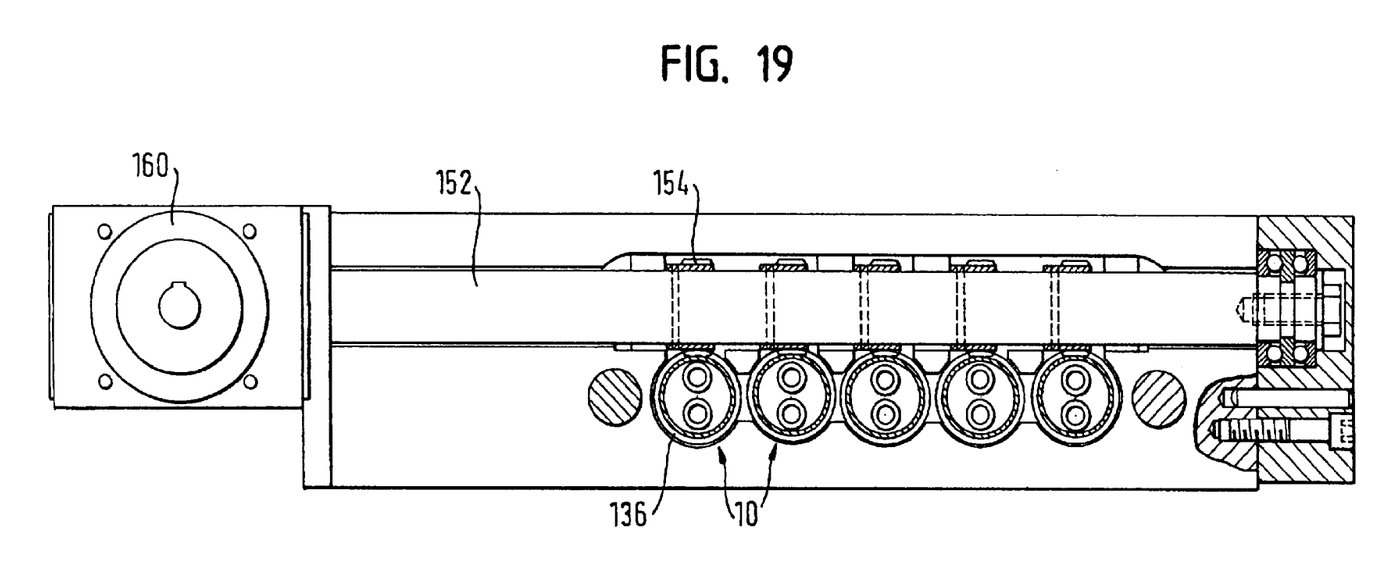

The embodiments illustrated in FIGS. 18 and 19 provide that a plurality of nozzle arrangements 10 are disposed side by side, in particular immediately adjacent to one another. The axes 148 of the individual nozzle arrangements 10 are in said case disposed parallel to one another and the individual rotors 22 are drivable by means of a common toothed belt 138 (FIG. 18) or a common shaft 152 (FIG. 19).

In the case of the embodiment driven by a toothed belt 138 (FIG. 18), the toothed belt 138 extends tangentially to the rotors 22 of the nozzle carriers 10. In the usual manner, which is therefore not described further, the toothed belt 138 is turned round by means of a pulley 156 and drivable by means of a drive wheel 158 of a drive motor (not shown).

In the embodiment illustrated in FIG. 18, the nozzle arrangements 10 are disposed so as to be rotated in each case through an angle of 90° about its axis 148. As a result, the strands of juxtaposed nozzle arrangements 10 emerge at a slightly greater distance from one another than is the case when the nozzle arrangements 10 are installed with nozzles 18 and 20 aligned identically in terms of their rotary position (FIG. 19). The greater distance reduces the risk of the strands touching and adhering to one another during baking. What is more, the nozzle arrangements 10 may be arranged extremely closely adjacent to one another, so that on a specific width of a conveyor belt more strands with bakery products may be disposed than was previously possible.

In the case of the embodiment driven by the shaft 152 (FIG. 19), the shaft 152 extends past the juxtaposed nozzle arrangements 10. In said case, either the shaft 152 has individual tooth systems 154 matching the external tooth systems 136 lying opposite or a continuous tooth system is formed along the shaft 152. The shaft 152 may in the usual manner, which is therefore not described further, be turned round e.g. by a universal joint and is drivable by means of a drive motor 160, so that during extrusion the nozzle arrangements 10 rotate synchronously relative to one another.

By virtue of the synchronous rotation of the nozzle arrangements 10, during extrusion a plurality of identically coiled strands of bakery products, e.g. upwards of thirty strands, are produced simultaneously.

FIGS. 20, 21, 24 and 25 illustrate an embodiment of a nozzle arrangement 10, by means of which it is possible to manufacture a bakery product 162 comprising two strands 164 and 166, wherein each strand 164 and/or 166 has a different filling 168 and/or 170 of inner substance and a different coating 172 and/or 174 of outer substance. For said purpose, in the nozzle arrangement 10 the feed channel 68 is connected by the connection channel 72 to the inner nozzle 16, the feed channel 78 is connected by the annular space 76 and the connection channel 93 to the outer nozzle 18, and the feed channel 88 is connected by the annular space 90 to the outer nozzle 20. The configuration of the feed channels 68, 78 and 88, the connection channels 72 and 93 and the annular spaces 76 and 90 is in said case of an analogous design to the embodiments illustrated in FIGS. 4, 7, 17. By virtue of the configuration being of an identical type, it is possible simply by exchanging the nozzle arrangement 10 to manufacture widely differing bakery products using a single device.

Figure 20:
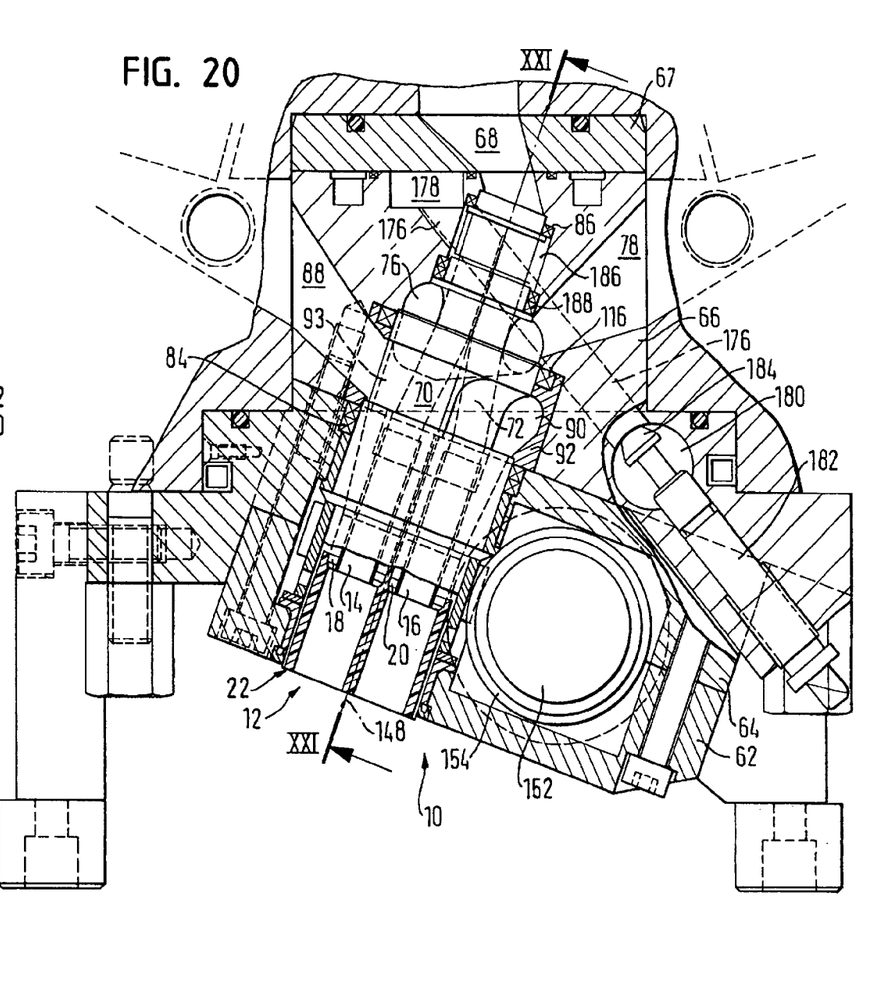

The nozzle arrangement 10 illustrated in FIG. 20 moreover has a fourth feed channel 176, which is formed together with a buffer volume 178 in the housing part 66. Leading to the feed channel 178 is a transverse channel 180, which extends at right angles to the drawing plane of FIG. 20. An adjustable metering device 182 for each nozzle arrangement 10 is disposed at the transverse channel 180 and is capable of throttling or closing the connection between transverse channel 180 and feed channel 178 by means of a valve 184. At the nozzle arrangement 10 in at least one of the channels a pressure sensor (not shown) is disposed, by means of which the pressure in the corresponding channel is determined and relayed in the form of an electrical signal to a controller. With the aid of the controller and the metering device 182 the pressure of the substance in the feed channel 178 is adapted to the pressure of the substance and/or substances in the other channels of the nozzle arrangement. It is therefore possible to feed a fourth substance to the nozzle arrangement 10 and still obtain a high accuracy of weight and dimensions of the extruded bakery product 162.

Figure 21:
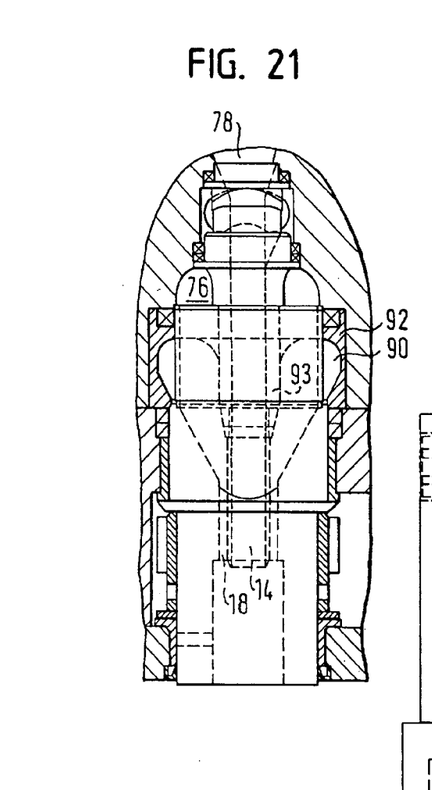
Figure 22:
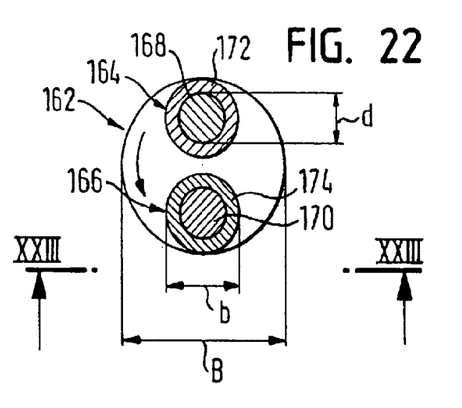
Figure 23:
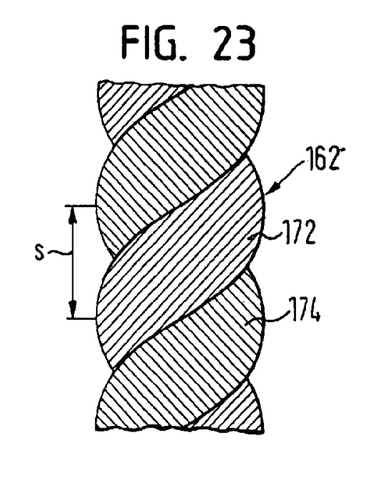

In the nozzle arrangement 10 illustrated in FIGS. 20 and 21 a further annular space 186 is formed between the feed channel 68 and the annular space 78 and is sealed off from the annular space 76 by means of a seal 188. The annular space 186 is in communication with the feed channel 176 and with the connection channel 70, which is formed in the insert 52 analogously to the embodiment illustrated in FIG. 7. The connection channel 70 leads to the inner nozzle 14.

Figure 24:
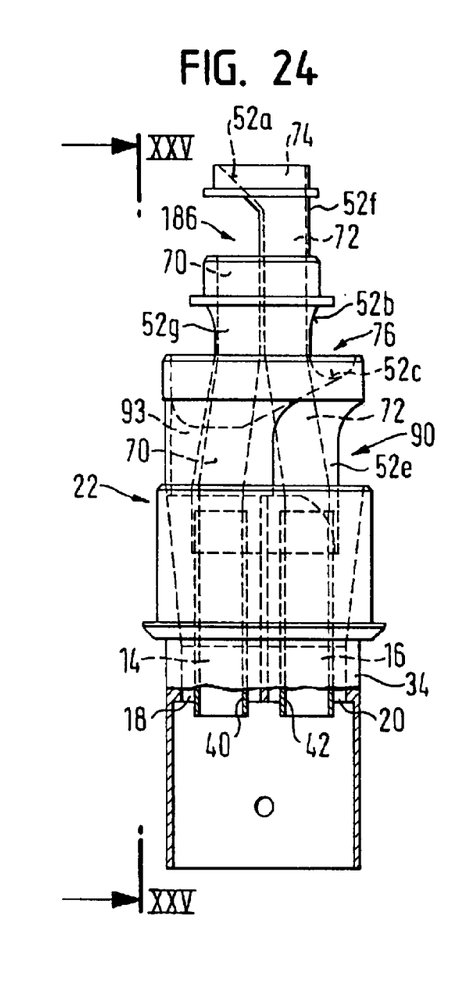
Figure 25:
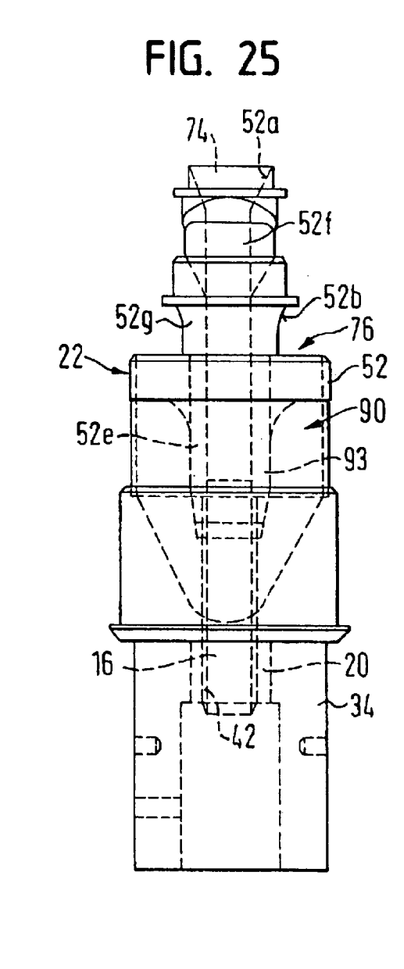

FIGS. 24 and 25 show the rotor 22 of the nozzle arrangement 10 illustrated in FIG. 20. The rotor 22 is fashioned in the region of the annular spaces 76 and 90 in a substantially identical manner to the rotor 22 illustrated in FIGS. 13 and 14. In the case of the rotor 22 illustrated in FIGS. 24 and 25, however, the connection channels 70 and 72 extend alongside to one another and do not meet. The connection channel 72 is connected by the hollow 74 to the feed channel 68, wherein a smooth transition is formed by means of the oblique lateral wall 52a.

The annular space 186 lies immediately below the hollow 74, wherein a portion 52f of the insert 52 surrounding the connection channel 72 extends in the middle region of the annular space 186. The portion 52f is in said case disposed eccentrically so that during rotation of the rotor 22 said portion conveys and uniformly distributes the substance situated in the annular space 186.

Formed below the annular space 186 is the annular space 76, the middle region of which is formed by a portion 52g of the insert 52. Said portion 52g may be designed so as to be circular in cross section (as shown in FIGS. 24 and 25) or have the shape of a flattened oval, so that said portion 52g during rotation of the rotor 22 conveys and distributes the substance situated in the annular space 76.

What is claimed is:

1. A nozzle carrier (10) for extruding doughy substances, having a nozzle arrangement (12) comprising two inner nozzles (14, 16) for extruding at least one inner substance (26; 98; 112, 114; 168, 170), and two outer nozzles (18, 20) for extruding at least one outer substance (28; 100, 102; 110; 172, 174), wherein the outer nozzles (18, 20) each surround an inner nozzle (14, 16) with clearance, and all of the nozzles (14, 16, 18, 20) are rotatable about a common axis of rotation (148), and the inner nozzles (14, 16) each have a mouth (44, 46) and the outer nozzles (18, 20) each have a mouth (36, 38), characterized in that the mouths (36, 38) of the outer nozzles (18, 20) are disposed in flow direction downstream of the mouths (44, 46) of the inner nozzles (14, 16), a stator (60), in which a first (68), second (78) and third feed channel (88) are formed, as well as a rotor (22), which carries the nozzles (14, 16, 18, 20), is rotatably supported in the stator (60) and contains two connection channels (70, 72), which connect the first feed channel (68) in each case to an inner nozzle (14, 16), wherein between the stator (60) and the rotor (22) a first annular space (76) is formed, which connects the second feed channel (78) to a first outer nozzle (18), and a second annular space (90) is formed, which connects the third feed channel (88) to the second outer nozzle (20).

2. The nozzle carrier according to claim 1, characterized in that between the rotor (22) and the stator (60) a first (86), second (116) and third seal (84) are disposed, wherein the first seal (86) seals off the first connection channel (70), the first (86) and second seal (116) seal off the first annular space (76), and the second (116) and third seal (84) seal off the second annular space (90).

3. The nozzle carrier according to one of claim 1 or 2, characterized in that the axis of rotation (148) of the rotor (22) is the centre line of the nozzles (14, 16, 18, 20).

4. The nozzle carrier according to one of claim 1 or 2, characterized in that at least one of the annular spaces (76, 90) in longitudinal section is in sections circular or elliptical in shape.

5. The nozzle carrier according to one of claim 1 or 2, characterized in that the rotor (22) in the region of at least one annular space (90) is designed (52e) in such a way that, as it rotates, it simultaneously conveys substance contained in the annular space (90).

6. The nozzle carrier according to one of claim 1 or 2, characterized in that the rotor (22) in the region of at least one annular space (90) is in cross section of a flattened oval design (52e).

7. A device for extruding doughy substances, characterized in that at least one nozzle carrier (10) according to one of claim 1 or 2 is provided, and the rotor (22) is drivable by means of a traction mechanism gearing, in particular a toothed belt drive (136, 138), or a toothed gearing (136, 152, 154) with intersecting axes (148, 150).

8. Device according to claim 7, characterized in that a plurality of nozzle carriers (10) are disposed side by side and are drivable by means of a single traction mechanism gearing, in particular a toothed belt drive (136, 138), or a single toothed gearing (136, 152, 154) with intersecting axes (148, 150).

9. Device according to claim 8, characterized in that each nozzle carrier (10) is disposed so as to be inclined at an angle α of around 25' to the vertical.

* * * * *